United States Patent [19]

Backderf

[11] 4,049,894

[45] Sept. 20, 1977

[54] LATEX MODIFIED PORTLAND CEMENT AND USE THEREOF IN POLYMERIZATION REACTORS

[75] Inventor: Richard Harold Backderf, Richfield, Ohio

[73] Assignee: The B. F. Goodrich Company, Akron, Ohio

[21] Appl. No.: 607,628

[22] Filed: Aug. 25, 1975

[51] Int. Cl.² .................... C08F 2/18; C08F 14/06; C08F 14/08
[52] U.S. Cl. .................................. 526/62; 528/484
[58] Field of Search .................. 526/62, 74; 528/484

[56] References Cited

U.S. PATENT DOCUMENTS

| | | | |
|---|---|---|---|
| 3,515,709 | 6/1970 | Nelson et al. | 526/62 |
| 3,669,946 | 6/1972 | Koyanagi et al. | 526/62 |
| 3,778,423 | 12/1973 | Reiter | 526/62 |
| 3,915,944 | 10/1975 | Burgess et al. | 526/74 |
| 3,959,235 | 5/1976 | Nishigaki et al. | 526/62 |
| 3,962,202 | 6/1976 | Morningstar | 526/74 |

OTHER PUBLICATIONS

Encyclopedia of Chemical Technology, Kirk–Othmer, 2nd Ed., Interscience, vol. 4, pp. 690–692 (1964).

*Primary Examiner*—Alan Holler
*Attorney, Agent, or Firm*—J. Hughes Powell, Jr.

[57] ABSTRACT

In the aqueous polymerization of vinyl chloride and vinylidene chloride polymers and copolymers, the polymer build up normally experienced in many areas of commercial polymerization reactors is reduced, or when such polymer build up does occur it is more readily removed, when these trouble areas in polymerization reactors are coated with a latex-modified portland cement composition, the polymer in said latex containing carboxyl groups and the polymer having a Tg ° C. of less than about 40° C., preferably less than about 25° C.

12 Claims, No Drawings

LATEX MODIFIED PORTLAND CEMENT AND USE THEREOF IN POLYMERIZATION REACTORS

CROSS REFERENCE TO RELATED APPLICATIONS

Related applications are Ser. No. 566,086, filed Apr. 8, 1975 for Henry J. Kehe and Marion G. Morningstar, now abandoned, and Ser. No. 574,037, filed May 2, 1975 for Donald E. Witenhafer, James B. Haehn and Louis Cohen.

BACKGROUND OF THE INVENTION

The polymerization of vinyl chloride or vinylidene chloride is normally conducted in pressure vessels with water in the presence of dispersion, suspension or emulsifying agents and free radical forming catalysts. The suspending agents usually employed include partially hydrolyzed polyvinyl acetate, polyvinyl alcohol, cellulose ether, gelatin, methyl cellulose and derivatives thereof. Catalysts normally employed are organic peroxides such as lauryl peroxide, benzoyl peroxide, acetyl cyclohexyl sulfonyl peroxide, acyl peroxide, isopropyl peroxydicarbonate, di-secondarybutyl peroxydicarbonate and other well known free radical forming catalysts. The polymerization normally is conducted in the range of 30° C. to 60° C. but as is well known may be conducted at higher or lower temperatures, as 0° to 100° C.

In any event, during the aqueous polymerization of vinyl chloride or vinylidene chloride monomers (hereinafter referred to as vinyl halide monomers), polymer deposits form on the inner walls of vessels and build up even more rapidly at certain trouble spots in commercial size reactors, depending in part on the design of the reactor, but generally, relating to areas where suspension flow is interrupted or is decreased, in those areas where there are "dead spots" and areas where small particles may be separated from the suspension and grow during the polymerization process. These areas include, for example, annular cavities, around baffle supports, thermocouples, nozzles, and the like. Another potential source of problem is at the bottom of reactors where there often is an area not completely drained when the reactor is emptied and these areas are dead spots. Further, many polymerization reactors for vinyl halide polymers have a glass lining and over a period of time this glass lining becomes cracked, broken and the base metal is exposed. These areas are also sources for abnormal polymer build up.

When polymer build up begins in these type of locations the build up tends to grow with successive charges at an increasing rate unless the reactor is cleaned after each polymerization. Polymer build up also contributes to poor quality polymer since it often breaks off during the course of polymerization and becomes intermingled with the polymer being polymerized. It is well known, of course, that such build up also interferes with heat transfer and the like.

It is known to be a toxological hazard for workers to enter the reactors to hand clean these polymer build ups, and while mechanical equipment has been devised to remove the polymer, it obviously is still desirable to improve the polymerization conditions such that the amount of polymer is reduced for economic, quality and other reasons, and as a minimum, that any undesired polymer build up that is formed is more readily removed by such mechanical cleaning means.

SUMMARY OF THE INVENTION

The build up of undesirable deposits of vinyl halide polymer during the free radical aqueous polymerization of vinyl halide monomer into homo- and copolymers is decreased and any resulting build up is more readily removed when problem areas in polymerization reactors are filled, coated or streamlined with certain latex-modified portland cememt formulations. These latex-modified portland cement formulations comprise portland cement and a polymer latex, which polymer has a Tg ° C. of less than about 40° C. and contains bound carboxyl groups. These latex-modified cement compositions, when used to fill, cover or streamline polymer build up trouble spots and areas in reactors, eliminates or reduces build up formation and facilitates removal of any such polymer build up.

DETAILED DESCRIPTION

The cements described in Encyclopedia of Chemical Technology, Kirk-Othmer, 2nd Interscience, Vol. 4, pages 684 to 705, and employed generally in the process of this invention are portland cement types and known equivalents thereof. Types I, II and III are normally preferred since they contain a higher percentage of tricalcium silicate which contributes to a faster setting and hardening rate of the latex modified cement composition. This is desirable so that a reactor may be treated and a minimum of time lost from production during the time it takes for the composition to harden sufficiently to allow continued polymerization.

These cements normally contain about 20 to 23% $SiO_2$, about 4.5 to 6% $Al_2O_3$, about 3 to 4.5% $Fe_2O_3$, about 63 to about 64.5% CaO, about 2 to 3% MgO, about 1.5 to 2.5% $SO_3$. While slower curing cements may be employed, the time to obtain a satisfactory cure in the treated reactor under normal conditions may be several days and generally this is uneconomical, but such cements may be used if it is not necessary that one obtain quick set-up of the cement composition.

A typical cement material that has been found to be satisfactory on a commercial basis in the suspension polymerization of vinyl halide monomers is a composition of 100 weight parts of type III portland cement, 50 weight parts of a high alumina cement which contains about 5.3% $SiO_2$, 39.8% $Al_2O_3$, 14.6% $Fe_2O_3$, 33.5% CaO and 1.3% MgO, 15 weight parts of hydrated lime and 250 weight parts of sand sieved through 20 mesh. This material not only hardens very rapidly in place, but has a workable pot life when mixed with the latex modifier. Other useful mixtures include equivalent mixtures of portland cement, hydrated lime and sand. The amount of alumina cement of course, may be varied from 0 to 100 weight parts, the lime from 0 to 100 weight parts and sand from about 100 to 600 weight parts.

As to cure time, the formulation provided above containing the high alumina cement, when applied to a reactor surface, is cured after about 4 hours at 80° C. Another formulation containing one part Type III portland cement, one part hydrated lime and 6 parts of #20 sieved sand required about 16 hours at 80° C. However, since, under normal conditions, the coating material often may be required to be replaced after, for example, 50 or 100 charges, it is more economical to have a quick curing cement composition rather than one that requires several days for curing, even though the latter will provide satisfactory protection to retard polymer formation in the reactors. It will be understood, of course, that other equivalent hydraulic cements, mortars and concretes modified in accordance with this invention may be found to be satisfactory.

In providing the latex-modified cement compositions, the objective is to cover surfaces that tend to build up polymer at an excessive rate in polymerization reactors, a number of criteria must be met. In addition to reasonable cure time and resistance to polymer build up or ease of removal of polymer build up, these materials must have good adhesion to the surface applied, must not shrink excessively on curing, must be resistant to the polymerization conditions, including the extreme solvent effect of the monomers and pH conditions of the polymerization medium, as well as be resistant to cleaning methods used to clean the polymerization reactor.

Previous work has shown that polymeric organic coatings were unable to stand the solvent action of hot vinyl halide monomers or the erosive effects of cleaning. An attempt was made to use known or commercially available hydraulic and water-proof cements which generally proved to be unsatisfactory for failure to adhere or be resistant to polymerization conditions. However, it was found that latex modified portland cement compositions of this invention would provide rapid cure time, satisfactory adjesion to polymerization surfaces and the necessary resistance to the solvent effect of a vinyl halide monomer, polymerization conditions and extreme conditions of cleaning.

However, in order to realize these advantages in addition to the defined cements, it is necessary that these cements contain a polymer, provided normally by mixing a latex, with the cement. The requirements for these latexes is that they mix with and are not readily coagulated by the cement mixture, that the mixture remains workable long enough for application, that they do not interfere with the cure rate of the cement, and that they provide in combination with the cement material the necessary adhesion even to stainless steel, resistance to hot solvent and the polymerization medium, and erosive effects of cleaning.

A number of commercial latexes were tried for this application and were found to be unsuitable. For example, commercial materials recommended for modifying cement generally are of three general types, vinylidene chloride copolymers, vinyl acetate copolymers and butadiene-acrylonitrile or butadiene-styrene polymers, all in latex form. When these commercial materials were mixed with cement and evaluated, they were found to be deficient in one or more respects. Many of them when mixed with cement had unsatisfactory pot life so that they could not be readily applied to the polymerization surface. Many of the compositions did not provide the necessary adhesions for these applications and they were generally deficient in solvent or erosion resistance and were otherwise unsatisfactory.

It was found that the polymer latexes most satisfactory for use in the latex-modified cement formulations were latex polymers containing carboxyl groups normally supplied by copolymerizing carboxyl-containing vinylidene monomers as acrylic acid, methacrylic acid, sorbic acid and the like with other hereinafter defined vinylidene comonomers. The amount of acid may be varied quite broadly but more preferably is from about 1 to about 10 weight parts per 100 weight parts of monomer, but larger amounts up to 25% or more, have been found to be useful. These carboxyl groups also may be obtained in polymers by hydrolysis and other chemical treatment of carboxyl precursors in polymers, including for example carboxylation of diene polymers with mercapto-acids, hydrolysis of polyacrylates, and copolymerized acyl halides, and the like.

However, the desired carboxyl groups are more readily introduced into the copolymers by copolymerization of olefinically unsaturated carboxylic acid monomers containing at least one carbon-carbon double bond susceptible to polymerization and at least one carboxyl group. Acids with the double bond in the $\alpha, \beta$-position with respect to the carboxyl group

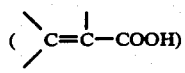

or with a terminal methylene grouping ($H_2C\!=\!C<$) are especially useful by virtue of their ready availability and ease of polymerization. Typical olefinically unsaturated carboxylic acid monomers useful in the present invention include such widely divergent materials as acrylic acid, methacrylic acid, ethacrylic acid, $\alpha$-chloroacrylic acid, $\alpha$-cyanoacrylic acid, crotonic acid, $\beta$-acryloxy propionic acid, hydrosorbic acid, sorbic acid, $\alpha$-chlorosorbic acid, cinnamic acid, $\beta$-styryl acrylic acid, hydromuconic acid, muconic acid, glutonic acid, aconitic, itaconic acid and the like. Excellent results are obtained with $\alpha, \beta$-olefinically unsaturated monocarboxylic acid monomers containing from 3 to 6 carbon atoms. Mixtures of two or more of the above-mentioned carboxylic acid monomers may be employed to prepare the present polymer latices. It may also be useful for the present invention to employ acid anhydrides formed by the elimination of one molecule of water from two carboxyl groups located on the same polycarboxylic acid molecule, such as maleic anhydride and the like.

The other comonomers used to form the copolymers should be of a nature so that the resulting copolymer is film-forming at room temperature, which film preferably is flexible. As a guide to the physical properties of such polymers, better results have generally been obtained with those copolymers which have a Tg less than about 40° C. and more preferably in the range of about 80° C. to 25° C.

It is generally preferred that the copolymers contain at least one softening monomer in amounts to contribute to film-forming properties, for example, butadiene, isoprene and preferably the lower alkyl acrylates of the formula

where R is alkyl of 1 to 8 carbon atoms including methyl acrylate, ethyl acrylate, butyl acrylate, propyl acrylate, amyl acrylate, 2-ethylhexyl acrylate, and the like, or butadiene or isoprene. The other essential comonomer is, of course, a carboxyl-containing or carboxyl precursor.

The softening monomer is preferably one having a homopolymer glass temperature Tg °C. of less than 25° C. so that the copolymer has a Tg °C. of less than 40° C.

The temperature at which a polymer changes from a rubbery solid to a brittle substance (the "glass" state), i.e., when it will not tolerate appreciable deformation without fracture, is usually referred to as the "second-order transition temperature" or "glass temperature," and generally is designated by the symbol Tg. Details on measuring the second-order transition temperature of polymers and the ramifications of this value are given in the books "Principles of Polymer Chemistry," Paul J. Flory, Cornell University Press, Ithaca, N. Y., 1953, pp. 52–53 and 56–57, and in "Monomeric Acrylic Esters," E. H. Riddle, Reinhold Publishing Corp., New York, N. Y., 1954, pp. 59–60. Listed below are the glass temperatures of some typical acrylate and methacrylate ester homopolymers.

| Polymer: | Tg, ° C. |
| --- | --- |
| Poly(lauryl methacrylate) | −65 |
| Poly(2-ethylhexyl acrylate) | −55 |
| Poly(butyl acrylate) | −52 |
| Poly(ethyl acrylate) | −22 |
| Poly(octyl methacrylate) | −20 |
| Poly(hexyl methacrylate) | − 5 |
| Poly(β-cyano ethyl acrylate) | 6 |
| Poly(methyl acrylate) | 3–9 |

The glass temperatures of the acrylate interpolymer rubbers embodied herein, i.e., containing the amide constituent, are comparable to those of the corresponding acrylic homopolymers. If the interpolymer is to contain one or more of the aforesaid monoolefinically unsaturated comonomers, the maximum allowable amount thereof is dependent on the requisite of obtaining an interpolymer having a glass temperature below the aforesaid upper limit. The permissible amounts are easily determined from the glass temperatures of the homopolymers of the acrylates and of the homopolymers of the optional comonomers, Tg values for some typical representatives of the latter being given below.

| Polymer | Tg, ° C. |
| --- | --- |
| Poly(butyl methacrylate) | 20 |
| Poly(vinyl acetate) | 29 |
| Poly(propyl methacrylate) | 35 |
| Poly(cyclohexyl methacrylate) | 58 |
| Poly(ethyl methacrylate) | 65 |
| Poly(vinyl chloride) | 82 |
| Poly(acrylonitrile) | 97 |
| Poly(styrene) | 100 |
| Poly(methyl methacrylate) | 105 |

A simplified relationship for determining the glass temperature of copolymers is expressed as:

$$1/T_g = W_1 Tg_1 + W_2/Tg_2 + W_n/Tg_n$$

where $W_1$ and $W_2$ and etc. are the respective weight fractions of the monomers in the copolymer and $Tg_1$ and $Tg_2$ and etc. are the glass temperatures of the respective homopolymers thereof, in degrees Kelvin.

The polymer latices of the present invention can contain one or more other copolymerizable vinylidene comonomers containing at least one terminal $CH_2C<$ group. Such polymerizable comonomers include: conjugated dienes such as butadiene, isoprene and piperylene; α-olefins such as ethylene, propylene, isobutylene, butene-1, 4-methylpentene-1; vinyl esters such as vinyl acetate; vinyl aromatics such as styrene, α-methyl styrene, vinyl toluene, vinyl naphthalene; alkyl vinyl esters such as methylvinyl ether, isobutyl vinyl ether, n-butyl vinyl ether and isobutyl vinyl ether, N-alkoxyalkyl amides of α, β-olefinically unsaturated carboxylic acids such as N-methoxymethyl acrylamide, N-methoxyethyl acrylamide, N-butoxymethyl acrylamide, N-butoxymethyl methacrylamide and the like; amides of α, β-olefinically unsaturated carboxylic acids such as acrylamide, methacrylamide, N-methyl acrylamide, N-t-butyl acrylamide, N-methyl methacrylamide, N-ethyl methacrylamide diacetone acrylamide and the like; acrylonitrile, methacrylonitrile and cyanoalkyl acrylates such as α-cyanomethyl acrylate and the α, β-olefinically unsaturated carboxylic acids such as methyl acrylate, ethyl acrylate, methyl methacrylate, 2-ethylhexyl acrylate, cyclohexyl acrylate and phenyl acrylate; and bis(β-haloalkyl) alkenyl phosphonates such as bis (β-chloroethyl) vinyl phosphonate; and the like. The nature of the comonomers is not critical so long as the polymer is a film-forming polymer containing free carboxyl groups in amounts of at least about 1%.

The polymer latices embodied herein are prepared employing conventional polymerization techniques preferably in an aqueous medium with a suitable polymerization catalyst. Overpolymerization of the monomers may also be employed. Aqueous dispersions of solution polymers may be used. The polymer may be present in the latex in an amount up to about 55–65% total solids.

The aqueous medium may be emulsifier-free or it may contain an emulsifier. When emulsifiers are used to prepare the latices of this invention, the usual types of anionic and non-ionic emulsifiers will be employed. Useful anionic emulsifiers include alkali metal or ammonium salts of the sulfates of alcohols having from 8 to 18 carbon atoms such as sodium lauryl sulfate; ethanolamine lauryl sulfate, ethylamine lauryl sulfate; alkali metal and ammonium salts of sulfonated petroleum and paraffin oils; sodium salts of sulfonic acids such as dodecane-1-sulfonic acid and octadiene-1-sulfonic acid; aralkyl sulfonates such as sodium isopropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium-n-octadecyl sulfosuccinamate; alkali metal or ammonium salts of the free acid of complex organic mono- and diphosphate esters; and the like. Non-ionic emulsifiers such as octyl- or nonylphenyl polyethoxyethanol may also be used. Latices having excellent stability are obtained with the alkali metal and ammonium salts of aromatic sulfonic acids, aralkyl sulfonates, long chain alkyl sulfonates and poly (oxyalkylene) sulfonates.

If an emulsifier is used, this may range up to about 6% or more by weight based on the monomers, but it preferably is less than 6%, and excellent results have been obtained with less than 1%. The emulsifier may be entirely added at the outset of the polymerization or it may be added incrementally or by proportioning throughout the run. Typically, a substantial amount of the emulsifier is added at the outset of the polymerization and the remainder charged incrementally or proportionately to the reactor as the monomers are proportioned.

The polymerization may be conducted at temperatures from about 0° C. or less to about 100° C. in the presence of a compound capable of initiating the polymerizations. Commonly used free radical initiators include the various peroxygen compounds such as persulfate, benzoyl peroxide, t-butyl hydroperoxide, cumene hydroperoxide, t-butyl diperphthalate, pelargonyl peroxide and 1-hydroxycyclohexyl hydroperoxide; azo compounds such as azodiisobutyronitrile and dimethylazodiisobutyrate; and the like. Particularly useful initiators are the water-soluble peroxygen compounds such as hydrogen peroxide and the sodium, potassium and ammonium persulfates used by themselves or in an activated redox system. Typical redox systems include alkali metal persulfates in combination with a reducing substance such as polyhydroxyphenols and oxidizable sulfur compounds such as sodium sulfite or sodium bisulfite, a reducing sugar, dimethylamino propionitrile, a diazomercapto compound and a water-soluble ferricyanide compound or the like. Heavy metal ions may also be used to activate the persulfate catalyzed polymerization. Polymer latices having excellent stability are obtained with alkali metal and ammonium persulfate polymerizations. The amount of initiator used will generally be in the range between about 0.1% to 3% by weight based on the total monomers and preferably is between about 0.15% and 1% by weight. The initiator may be charged completely at the outset of the polymerization, however, incremental addition or proportioning of the initiator throughout the polymerization may also be employed and is often advantageous.

Typical polymerizations for the preparation of the low-temperature curable polymer latices are conducted by charging the reactor with the appropriate amount of water and electrolyte, if any is to be employed, a portion of the emulsifier, if any, and a portion of the initiator sufficient to initiate the polymerization. The reactor is then evacuated, heated to the initiation temperature and charged with a portion of the monomer premix which is previously prepared by mixing water, emulsifier, the monomers and polymerization modifiers, if any are employed. After the initial monomer charge has been allowed to react for a period of time the proportioning of the remaining monomer premix is begun, the rate of proportioning being varied depending on the polymerization temperature, the particular initiator employed and the amount of vinylidene halide monomer being polymerized. After all the monomer premix has been charged the final addition of initiator is made and the reactor and the latex heated with agitation for a length of time necessary to achieve the desired conversion.

Exellent results have generally been obtained with those latices containing small amounts of emulsifiers, soaps, suspending agents or dispersants, for example, with latices prepared with less than about 2% of emulsifier, soap and the like. Acceptable emulsifier-free latices have been prepared with substantially water-soluble monomers such as ethyl acrylate and acrylic acid, often with small amounts of acrylonitrile and acrylamide that do not require any emulsifier. Many latices having poor stability when mixed with the cement may be satisfactory when there is added thereto small amounts of nonionic emulsifying agents as 0.1 to 10 weight percent so as to stabilize the latex to extend the working time of the composition.

The nature of the cement employed has some effect on latex used in the cement and it has been found that in cement compositions containing 1 part of portland cement type III, 1 part of hydrated lime and 6 parts of sand, that a great variety of latices may be used, while with the high alumina cement composition, some of the latices satisfactory in this latter composition tend to be less stable, but these variations are readily determined and adjusted for by those skilled in the art.

As examples of low soap latexes found to be useful in preparing the latex modified portland cement compositions of this invention are 20–25% total solids latexes of copolymers of about 60 parts butyl acrylate, 20 parts acrylonitrile, 10 parts styrene, 5 parts acrylic acid, 5 parts methacrylamide prepared with less than 1 part of the ammonium salt of sulfated ethoxylated lauryl alcohol as $C_{12}H_{25}(OC_2H_4)_3SO_4^-NH_4^+$ as the emulsifier and 0.6 part of a persulfate in 150 weight parts of water per 100 weight parts of monomer, all on a weight basis. The latex was made by proportioning the monomers. Another useful latex is a copolymer of 45 weight parts butyl acrylate, 44.5 weight parts styrene, 5 weight parts acrylonitrile, 1 weight part N-methylol acrylamide and 4.5 weight parts acrylic acid, prepared with 0.75 weight part of disodium 4-dodecylated oxydibenzene sulfonate as the emulsifier and a persulfate catalyst. Another useful latex was made with 0.15 part dodecylbenzene sulfonate. Ammonium persulfate and potassium persulfate were satisfactory catalysts.

In the latex, the particle size may be in the range of about 1000A. A generally satisfactory particle size may be, however, from about 500 to about 5000A. The total solids of the latices may be varied widely and may relate to the fluidity wanted in the composition. 10% total solids latex providing more water, if desired, than 50 or 65% total solids latex.

The amount of dry polymer in the cement compositions may be varied from very low amounts to obtain some improvement in adhesion, solvent resistance, etc., so that greater than 0.1, normally about 1 part per 100 weight parts of cement composition are used. More normally an amount from about 4 to 8 parts is used. While larger amounts may be used, they often contribute to increased shrinkage during drying so that less than 10 weight parts of polymer solids is employed and more preferably from about 4.5 to 7.5 weight parts is used.

The latex used for cement modification to obtain the advvantage of this invention, particularly in the presence of hot vinyl halide monomer, should possess a combination of ususual properties including (1) good colloidal stability, especially to calcium ions, (2) it must form a polymer cement combination which is not softened or weakened by hot vinyl halide monomer or the comonomers copolymerized therewith, and (3) it must provide improved adhesion of the cement composition to carbon steel, stainless steel, glass and the like.

It is believed that improved stability is obtained, particularly, when the latex is prepared with a persulfate catalyst and contains greater than 1% of water soluble monomer. The desired properties of the latex provide ready mixing in the cement composition without coagulation and contribute to a long enough pot life so that the cement composition can be applied to the polymerization surfaces over a reasonable period of time.

Lower amounts of soaps in the polymerization recipe and the later addition of nonionic soaps appear to contribute to collodial stability. As to the other desired attributes, it is necessary that the polymer form a flexible film readily at temperatures below about 40° C. and more preferably below about 25° C. At least about one weight part of carboxyl groups should be present in the copolymer to provide the desired resistance to hot vinyl halide monomer. We have found that latices that otherwise might be satisfactory in having the necessary stability and Tg °C. in film-forming properties are not satisfactory in the presence of hot vinyl halide monomer when the copolymer does not contain carboxylic acid groups.

In providing useful latices, we have found a particularly useful groups, those containing greater than about 40% of a lower alkyl acrylate wherein the alkyl group contains 1 to 8 carbon atoms, about 1 to 15 weight parts acrylic acid, about 1 to 5 weight parts methacrylamide or acrylamide, the remainder being styrene or acrylonitrile.

The invention is of particular value when applied to the polymerization of a vinyl halide or vinylidene halide monomer, or mixtures thereof in water, with other olefinically unsaturated or vinylidene comonomers. The vinyl or vinylidene halide monomers correspond to the structural formula

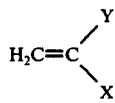

wherein X is a halogen selected from the group consisting of chlorine, bromine or fluorine and Y is hydrogen or a halogen the same as defined for X. An especially useful vinyl halide monomer of the above type is vinyl chloride. The amount of vinyl chloride monomer will range from about 40% or more, preferably about 55%, to 100% by weight of the total monomer composition.

In addition to the vinyl chloride monomer, one or more other polymerizable olefinically unsaturated, vinylidene comonomers preferably containing at least one terminal methylene group ($H_2C{=}C{<}$) may also be employed therewith. Usually less than about 50% by weight of these polymerizable comonomers are present. Copolymerizable comonomers include dienes of 4 to 10 carbon atoms; ethylidene norbornene and dicyclopentadiene; α-olefins such as ethylene, propylene, isobutylene, butene-1 and 4-methylpentene-1, preferably containing 1 to 8 carbon atoms; vinyl bromide, vinylidene chloride, vinyl fluoride; vinyl esters such as vinyl acetate, vinyl laurate and vinyl chloroacetate; vinyl aromatics such as styrene, chlorostyrene, α-methyl styrene, vinyl toluene and vinyl naphthalene; alkyl vinyl ethers and ketones such as methyl vinyl ether, isobutyl vinyl ether, N-butyl vinyl ether, chloroethyl vinyl ether, methyl vinyl ketone and isobutyl vinyl ether; α,β-olefinically unsaturated nitriles such as acrylonitrile, methacrylonitrile; cyanoalkyl acrylates such as α-cyanomethyl acrylate and the α-, β- and γ-cyanopropyl acrylates; olefinically unsaturated carboxylic acids as acrylic acid, methacrylic acid and the like; esters of olefinically unsaturated carboxylic acids including α, β-olefinically unsaturated acids such as methyl acrylate, ethyl acrylate wherein the alkyl groups contain 1 to 8 carbon atoms, chloropropyl acrylate, methyl methacrylate, ethyl methacrylate, 2-ethylhexyl acrylate, cyclohexyl acrylate, phenyl acrylate, glycidyl acrylate, glycidyl methacrylate, ethoxyethyl acrylate, esters of maleic and fumaric acid, amides of the α, β-olefinically unsaturated carboxylic acids, and the like; polyfunctional monomers such as methylene bis-acrylamide; ethylene glycol dimethacrylate, diethylene glycol diacrylate, divinyl benzene and allyl pentaerythritol; bis (β-haloalkyl) alkenyl phosphonates such as bis (β-chloroethyl) vinyl phosphonate; α, β-olefinically unsaturated N-alkylol amides or α, β-olefinically unsaturated N-alkoxy-alkyl amide of the formula

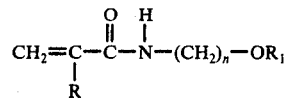

wherein R is hydrogen or an alkyl group containing from 1 to 4 carbon atoms, $R_1$ is hydrogen or an alkyl group containing from 1 to 8 carbon atoms and n is an integer from 1 to 4, including N-methylol acrylamide, N-methylol methacrylamide; amide monomers derived from an α,β-olefinically unsaturated carboxylic acid and having the structural formula

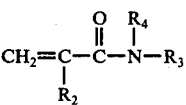

wherein $R_2$ is hydrogen or an alkyl group containing from 1 to 4 carbon atoms and $R_3$ and $R_4$ are hydrogen or a radical containing from 1 to 12 carbon atoms and more preferably an alkyl group containing from 1 to 8 carbon atoms including acrylamide and methacrylamide, N-propyl acrylamide, diacetone acrylamide and the like.

In carrying out the polymerization reaction there is used the usual catalyst or initiators which normally are free radical forming including organic peroxides and aliphatic azo compounds. Such materials include, for example, α, α'-azodiisobutyronitrile and the like; organic peroxides including diacyl peroxides such as acetyl peroxide in dimethyl phthalate, benzoyl peroxide, 2,4-dichlorobenzoyl peroxide, lauroyl peroxide, pelargonyl peroxide; peroxyesters such as ester-butyl peroxyacetate, tert-butyl peroxyisobutyrate, tert-butyl peroxypivalate, tert-butyl peroxy (2-ethyl-hexanoate); alkyl peroxides such as α, α'-bis-(t-butylperoxy)diisopropylbenzene, n-butyl-4,4-bis (tert-butylperoxy) valerate, di-tert-amyl peroxide, dicumyl peroxide, 2,5-dimethyl-2,5-bis (tert-butylperoxy) hexyne 3; hydroperoxides such as tert-butyl hydroperoxide, 1,1,3,3-tetramethyl butyl hydroperoxide, cumene hydroperoxide, 2,5-dimethylhexane-2,5-dihydroperoxide, diisopropylbenzene hydroperoxide; ketone peroxides such as methyl ethyl ketone peroxides; sulfonyl acyl peroxides such as acetyl cyclohexyl sulfonyl peroxide; acetyl sec-heptylsulfonyl peroxide; peroxy carbonates such as tert-butylperoxy isopropyl carbonate; peroxy dicarbonates such as bis (4-t-butylcyclohexyl) peroxy dicarbonate, dicyclohexyl peroxydicarbonate, diisopropyl peroxydicarbonate; tertiary alkyl perketals such as 2,2-bis-(tert-butylperoxy) butane; mixtures thereof and the like. Found useful are lauroyl peroxide, di-(2-ethyl hexyl) peroxydicarbonate, di-ethyl peroxydicarbonate, di(n-propyl)-peroxydicarbonate, diisopropyl peroxydicarbonate, di(sec-bulyl)peroxydicarbonate and acetyl cyclohexane sulfonyl peroxide.

The suspending agents usually employed include partially hydrolyzed polyvinyl acetate, polyvinyl alcohol, cellulose ether, gelatin, methyl cellulose and derivatives thereof; as copolymers of vinylidene monomers containing carboxyl groups as methyl methacrylate, methacrylic acid copolyers, polyacrylic acid, small amounts of water soluble phenol-formaldehyde resins, vinyl acetate-maleic acid or styrene-maleic anhydride copolymers and the like. Other usual additives may be included as buffers, salts, modifiers nd the like.

While, as has been stated, when polymerization reactor trouble spots are filled, coated or streamlined with the latex modified cement composition of this invention, that less build up is obtained than when the cement composition is not used, such build up is more readily removed than when the cement is not used. Further improvements in decreasing the amount of polymer build up is obtained when there is added to the cement composition certain types of polymerization inhibitors or when the cement surface, as well as the other reactor surface is covered by certain protective agents now known to those skilled in the art.

Such materials are described in U.S. Pat. No. 3,669,946 as being polar organic compounds, dyes, and pigments including, for example, polar organic compounds consisting of nitrogen atom containing organic compounds including, for example, compounds containing azo, nitro and amine groups; sulfur atom containing compounds such as thioethers, thioglycolic acid, thiourea, mercaptans and the like; oxygen containing compounds as phenone compounds such as parabenzophenone, aldehyde compounds, keto compounds; dyes such as the azo dyes, naphtho dyes, anthraquinone dyes, indigoid dyes, sulfur dyes and the like. Typical of the dyes employed in coating reactors include aniline, thioglycolic acid, methylene blue, nigrosine black, alizarine yellow, phthalocyanine blue, methylene blue and the like.

Other useful reactor coatings for this purpose are disclosed in U.S. application Ser. No. 566,086 disclosing coating compositions of a condensation polymer of m-phenylenediamine and resorcinol; and Ser. No. 574,037 directed to coating compositions of the structure

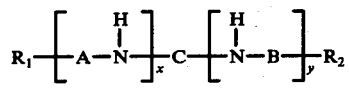
(A)

wherein A, B, and C are either

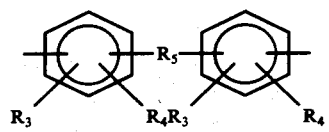

wherein $R_5$ is

or a straight chain or branched alkylene or alkylidene group containing from 1 to 5 carbon atoms, or

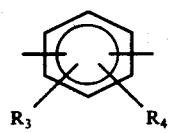

and wherein A, B, and C may be the same or different and each repeating unit may be the same or different; $R_1$ and $R_2$ are either —H, —OH, —NH$_2$, or

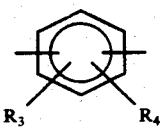

and may be the same or different; $R_3$ is —H, halogen, or an alkyl group containing from 1 to 8 carbon atoms and may be the same or different; $R_4$ is —H, —OH, —NH$_2$ or an alkyl group containing from 1 to 8 carbon atoms and may be the same or different; x is an integer from 1 to 20; and y is an integer from 0 to 20; and

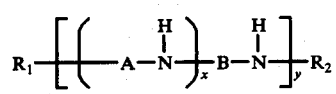
(B)

wherein A and B are the same as in (A); $R_1$, $R_3$, $R_4$ and $R_5$ are the same as in (A); $R_2$ is —H, or

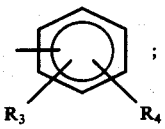

x is an integer from 1 to 4; and y is an integer from 1 to 15; typical of which are the reactions of m-phenylenediamine with resorcinol, bisphenol A and the like, and alkali metal salts thereof as is disclosed.

Particularly useful are polyaromatic amines having molecular weights in the range of about 250 to 2000 and softening points in the range from about 65° to 175° C. wherein the polyaromatic amine is, for example, a self-condensation product of any one of the compounds selected from polyamino benzenes, aminophenols, alkyl-substituted aminophenols, diphenylamines, and alkyl-substituted dipehnylamines or the condensation reaction product of more than two of the compounds selected from polyamino benzenes, polyhydric phenols, aminophenols, alkyl-substituted aminophenols, diphenylamines, and alkyl-substituted diphenylamines. Specific polyaromatic amines found to be particularly useful include the reaction product of o- or m-phenylenediamine and resorcinol or bisphenol A or self-condensed p-phenylene diamine or p-amino phenol. Particularly useful are straight chain or branched polyaromatic amines having molecular weights greater than about 250 dissolved in an aqueous alkali metal hydroxide solution as sodium hydroxide, potassium hydroxide or lithium hydroxide solutions of the reaction products of o- or m-paraphenylene diamine and resorcinol or bisphenol A or condensed aminophenol.

The practice of this invention may be further demonstrated in many ways. A typical base cement composition is prepared with 100 parts of type III portland cement, 50 parts of high alumina cement, 50 parts of hydrated lime and 250 parts of sand sieved through 20 mesh. These dry powders are mixed and then 22 weight parts of a 25% total solids latex carefully stirred into the mixture to form a workable mix. The latex was a copolymer of 50 weight parts n-butyl acrylate, 30 weight parts acrylonitrile, 10 weight parts styrene, 5 weight parts methacrylamide, 5 weight parts acrylic acid, polymerized in 100 weight parts of water with 0.15 weight part of the ammonia salt of sulfated ethoxylated lauryl alcohol, catalyzed with 0.6 weight part ammonium persulfate and the monomers proportioned. The resulting pasty mixture is readily trowelled into place.

Typical applications include repairing damaged glass areas in glass lined vessels. In glass lined polymerization vessels in certain areas, glass is often eroded away or cracks off because of alternate heating and cooling and for otheer reasons. The resulting exposed metal portions in the polymerizers cause problems in build up. In other words, difficult to remove polymer build up occurs more rapidly on bare carbon steel than on glass, and when such eroded areas are covered with the above latex modified cement mixture polymer, build up is decreased or is easier to remove.

Other trouble areas in many polymerization reactors are unused nozzles and entry ports that are readily filled with the latex modified cement. As has been disclosed before, primary areas of accelerated and troublesome polymer build up occur in thermocouple wells, baffle hanger fixtures, baffle support openings, stirrer shaft retainer plates, drain nozzles and the like. When such cavities, hollow and depressed areas and even protrusions that interfere with flow are covered with the latex modified cement composition polymer, build up is reduced and is easier to remove when polymer build up does occur.

Another important application of the compositions and process of this invention are in reactors where the bottom drain plug does not drain the reactor completely. This is often the case in reactors with bottom entry agitators. The agitator is located in the center of the reaction vessel bottom at the lowest point and therefore the bottom drain nozzle normally is located at some higher point. This results in an undrained heel when the reactor polymerizations are drained. Vinyl chloride polymer particles which remain here may be converted into undesirable fish-eyes in subsequent polymerizations and there are other related problems known to those skilled in the art. It has now been found that when this area is filled in with the compositions of this invention so that there is no heel left in the bottom of the reactor and all of the polymerization mixture is drained out, that these problems are eliminated. Better results have been obtained when reinforcing metal strips are attached to a modified bushing around the agitator shaft at the base to reinforce the latex modified cement composition or the fill cement is covered with a metal plate.

Even further advantages are obtained in accordance with this invention when the polymer composition contains polymerization inhibitors of the type disclosed hereinabove for example, the finely divided condensation reaction of m- or o-phenylene diamine and resorcinol or bis-phenol A, dyes including nigrosine black, methylene blue, and the like which provide further improvement in decreased polymer build up when mixed into the cement compositions, even in small amounts as low as about 0.05 part per 100 weight parts of cement composition to several weight parts, although larger amounts as up to 2 parts or more may be used, more than 1 part generally is not necessary. Many of the materials disclosed above may be used in the latex modified cement composition.

Even further advantages are obtained in accordance with this invention when the cement coated areas and the remainder of the polymerizer are coated with the polymerization inhibitors as described particularly in copending application Ser. No. 574,037. A typical coating material for the cement layers and remainder of the reactor are alkali metal solutions of the reaction product of diphenylamine and polyhydric phenols such as m-phenylenediamine, resorcinol, p-aminophenol, phloroglucinol and the like. For specific demonstration of the practice of the invention a polymerization reactor equipped with agitator, thermocouple, baffle supports and the like is first treated with the latex modified cement composition as described above by filling in the annular cavities around thermocouple and baffle supports by trowelling the cement into place, areas of the glass-lined reactor where the glass has been etched or cracked away are repaired by covering such areas with the latex modified cement, which composition is then cured in place for 8 hours at room temperature and 100% relative humidity, followed by 16 hours at 75° C. and 100% humidity. A caulking gun may be used, particularly if 25 weight parts of latex is used so that the composition is fluid enough to be handled in the caulking gun. If the reactor design is such that there is an undrained dead area at the bottom of the reactor, this is filled in with metal reinforced concrete to a level so that the reactor is completely drained and then coated with the polymer modified cement composition.

After suitable curing as described, the reactor was coated with the condensation reaction product of meta-phenylenediamine and resorcinol reacted in the presence of HCl at 207° C. The hydroxyl-substituted polyaromatic amine compound had a softening point of 65° C. and was dissolved in 2.5 N-sodium hydroxide. This solution was applied to all of the surfaces of the reactor, including the cement areas, dried and rinsed with water. The reactor was then charged in the normal manner with 1000 weight parts of vinyl chloride, 2055 weight parts of demineralized water, 0.5 weight part of 89% hydrolyzed polyvinyl acetate and 0.5 weight part of di-secondarybutyl peroxydicarbonate. The reaction was carried out with agitation at a temperature of 57° C. to substantial completion of the polymerization of the vinyl chloride monomers. After the polymerization mixture was removed from the reactor, it was found that there was essentially no paper build up and very minimal sandy build up on the blades of the agitator, as compared to polymerization in the absence of the cement wherein there will be polymer build up in the thermocouple cavity, the baffle support cavities and particularly difficult to remove polymer build up on exposed metal surfaces of the formerly glass lined reactor.

Additional reactions were carried out under the same conditions with other commercial polymerization recipes for suspension VCl in 3300 and 4300 gallon glass lined polymerization reactors for many times before it was necessary to shut down the reactor for cleaning. In some polymerizations, as many as 300 charges have been made and the cement in the thermocouple and baffle cavities as well as the bottom of the reactor are still in good shape and continued to result in decreased polymer formation and increased ease of removal of polymer build up even when polymer build up occurs.

In present day vinyl chloride polymerization technology, mechanical methods to clean the reactors internally without the necessity for a man entering are being used more and more. Most of these systems include high pressure water nozzles to wash down reactor walls and internal parts and remove polymer build up therefrom. While the latex modified cement coatings of this invention reduce polymer build up and enhance the ease of removal of polymer that does build up unless properly formulated, the latex modified cement may be subject to erosion from water jets. One of the advantages of the compositions of this invention is that such materials are normally resistant to a standard water cleaning apparatus used in vinyl chloride polymerization reactors particularly when used in cavities. When large areas are exposed, as in the bottom of a reactor, the layer may be protected with water during cleaning, or a metal cap be placed on this heel which itself is then coated with the latex modified cement composition so that if and where it does occur it may be readily repaired by trowelling cement composition onto these exposed areas.

Cements other than those specified herein and the conventional commercial latices that have heretofore been used in commercial cement formulations do not provide the required balance of adhesion, resistance to the solvent action of hot vinyl halide monomers and the other conditions such materials are exposed to during the polymerization reaction and the clean up that follows.

I claim:

1. In the aqueous polymerizatin of vinyl halide monomers having the structural formula

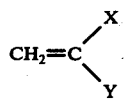

where X is chlorine and Y is chlorine or hydrogen, in a polymerization vessel wherein there are areas of excessive polymer build up on the surfaces and fixtures in said vessel exposed to the suspension during said polymerization, the improvement comprising coating said areas of excessive polymer build up prior to the polymerization reaction with a composition comprising portland cement and an aqueous dispersion containing up to about 65 weight percent of a polymer containing about 0.1 to 25 weight percent carbonyl groups and having a Tg° C. of less than 40° C., said polymer present in said composition in an amount less than about 10 weight parts per 100 weight parts of said composition.

2. The polymerization of claim 1 wherein the portland cement is type I, II, or III containing about 40 to about 55 weight percent tricalcium silicate, the polymer contains about 1 to 10 weight percent carboxyl groups and has a Tg° C. of lss than 25° C.

3. The polymerization of claim 2 wherein the cement is a type III cement and also contains 0 to 100 weight parts of a high alumina cement containing about 40 weight percent aluminum oxide, 0 to 100 weight parts of lime, and from about 100 to 600 weight parts of sand, per 100 weight parts of type III cement and the copolymer is a film-forming copolymer which contains butadiene, isoprene or a lower alkyl acrylate and about 1 to 10 weight percent of an α,β-olefinically unsaturated carboxylic acid containing 3 to 6 carbon atoms.

4. A suspension polymerization of claim 3 wherein the vinyl halide is vinyl chloride, said polymer contains an alkyl acrylate wherein the alkyl group contains 1 to 8 atoms and about 1 to 10 weight percent acrylic or methacrylic acid, there being present in said composition from 4 to 8 weight parts of polymer per 100 weight parts of composition.

5. The polymerization of claim 3 wherein said composition contains hydrated lime and sand and said polymer is present in said composition in about 4.5 to 7.5 weight parts per 100 weight parts of cement, lime and sand.

6. The polymerization of claim 5 wherein said polymer contains an alkyl acrylate wherein the alkyl group contains 2 to 4 carbon atoms, about 2 to 8 weight parts acrylic or methacrylic acid and said latex contains less than one part per 100 weight parts of monomer of an emulsifier, suspension or dispersion agent and the catalyst is a persulfate catalyst.

7. The polymerization of claim 6 wherein said polymer is a copolymer of more than 40 weight parts butyl actylate, contains at least one of styrene and acrylonitrile and 1 to 10 weight parts of an acrylamide.

8. The polymerization of claim 7 wherein said cement composition contains an inhibitor selected from the group consisted of polar organic compounds and dyes.

9. The polymerization of claim 4 wherein said polymer contains at least one additional vinylidene monomer having at least one terminal $CH_2C<$ group 10. In the polymerization of claim 1, after the reactor is coated with the cement composition and prior to said polymerization, the exposed inner surface of said vessel and other means contained therein are coated with a polar organic compound or dye.

11. The polymerization of claim 10 wherein the inner surfaces of said vessels and other means are coated with a polyaromatic amine having a molecular weight in the range of about 250 to 2000 and having a softening point from about 65° to 175° C.

12. The polymerization of claim 11 wherein the polyaromatic amine is a reaction product of o- or m-phenylene diamine and resorcinol or bisphenol A, and alkali metal salts thereof.

* * * * *

UNITED STATES PATENT AND TRADEMARK OFFICE
CERTIFICATE OF CORRECTION

PATENT NO. : 4,049,894
DATED : September 20, 1977
INVENTOR(S) : Richard Harold Backderf It is certified that error appears in the above-identified patent and that said Letters Patent are hereby corrected as shown below:

In Column 15, Claim 1, line 1 "polymerizatin" should read -- polymerization --. In Column 15, Claim 1, line 43 "carbonyl" should read -- carboxyl -- . In Column 15, Claim 2, line 51 "lss" should read -- less --. In Column 16, Claim 4, line 11 after "8" add -- carbon --. In Column 16, Claim 7, line 30 "actylate" should read -- acrylate --. In Column 16, Claim 8, line 34 "consisted" should read -- consisting --.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks